(12) United States Patent
Kerekes et al.

(10) Patent No.: US 7,331,273 B2
(45) Date of Patent: Feb. 19, 2008

(54) PNEUMATIC ACTUATOR

(75) Inventors: Laszlo Kerekes, Zurich (CH); Tina Moor, Saint-Blaise (CH)

(73) Assignee: Prospective Concepts AG, Glattbrugg (CH)

( * ) Notice: Subject to any disclaimer, the term of this patent is extended or adjusted under 35 U.S.C. 154(b) by 157 days.

(21) Appl. No.: 10/506,157

(22) PCT Filed: Feb. 17, 2003

(86) PCT No.: PCT/CH03/00110

§ 371 (c)(1),
(2), (4) Date: Oct. 20, 2004

(87) PCT Pub. No.: WO03/074885

PCT Pub. Date: Sep. 12, 2003

(65) Prior Publication Data
US 2005/0081711 A1 Apr. 21, 2005

(30) Foreign Application Priority Data
Mar. 4, 2002 (CH) .................................... 0376/02

(51) Int. Cl.
*F01B 19/00* (2006.01)
(52) U.S. Cl. ............................................... 92/92; 92/90

(58) Field of Classification Search ..................... 92/89, 92/90, 91, 92; 296/180.5; 297/284.9, 466
See application file for complete search history.

(56) References Cited

U.S. PATENT DOCUMENTS 3,973,363 A 8/1976 LaPorte et al.
5,469,756 A 11/1995 Feiten
5,833,291 A * 11/1998 Haugs ..................... 294/119.3

FOREIGN PATENT DOCUMENTS

| DE | 19617852 | 10/1997 |
| EP | 0851829 | 7/1998 |
| WO | WO 01/72479 | 10/2001 |
| WO | WO 03/024280 | 3/2003 |

* cited by examiner

*Primary Examiner*—Michael Leslie
(74) *Attorney, Agent, or Firm*—Winstead PC

(57) ABSTRACT

A pneumatic actuator having a flexible plate, the flexible plate being made of a rigid flexible material. The pneumatic actuator further includes at least two elongate, flexible but poorly extensible pneumatic pressure ducts that are disposed side by side and are in parts connected to the flexible plate to which they are secured and on which they are arranged in such a manner that, when the pressure ducts are pressurized with compressed gas, tangential forces are generated parallel to the flexible plate causing said flexible plate to bend.

20 Claims, 7 Drawing Sheets

Figure 1:
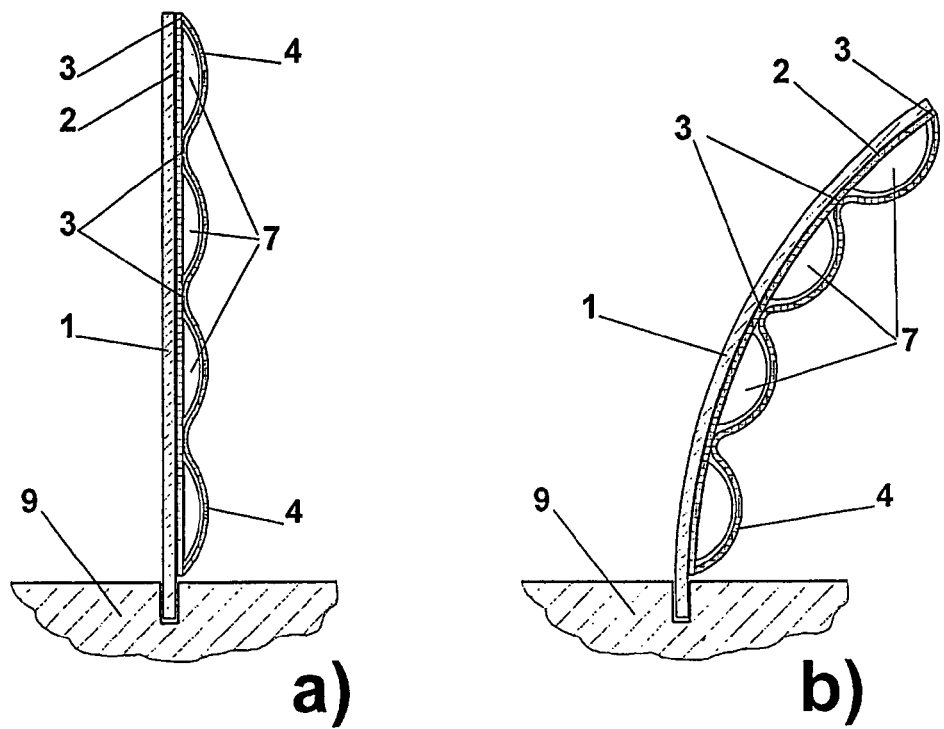
Figure 1:
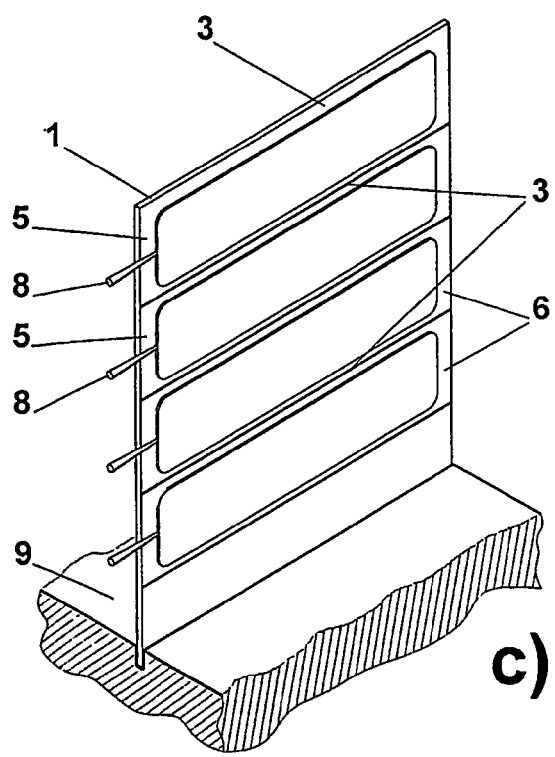

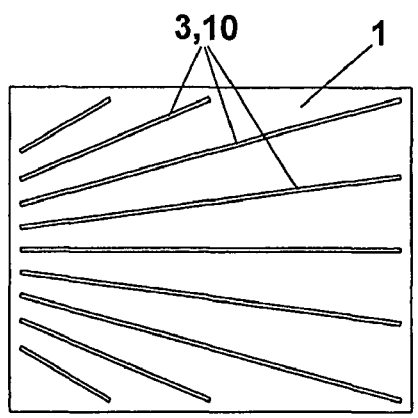
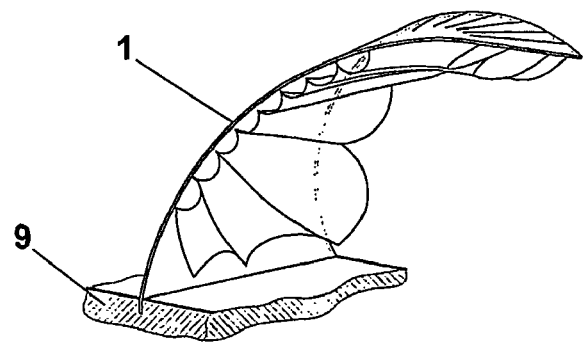
Fig. 5          Fig. 6
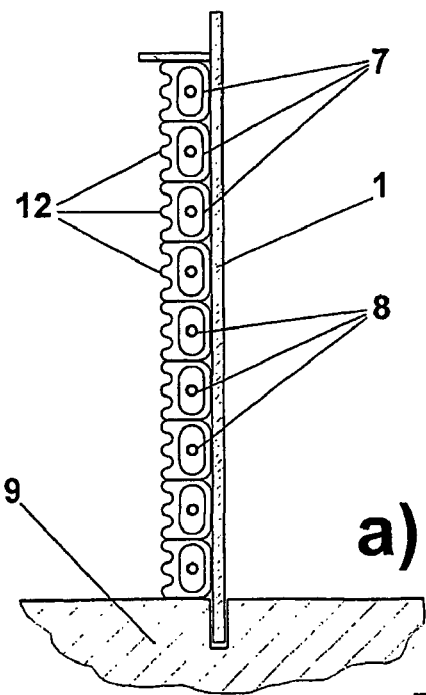
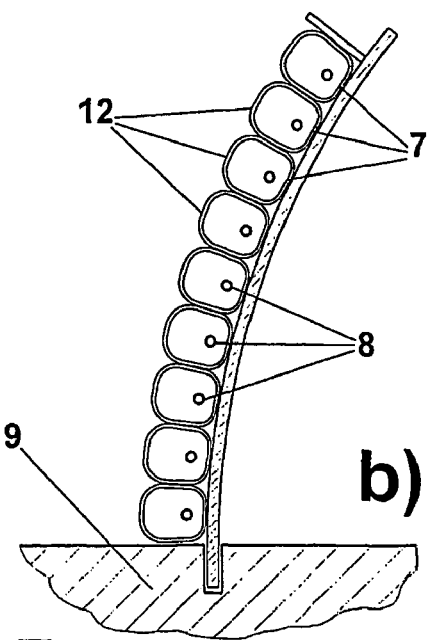
Fig. 7

PNEUMATIC ACTUATOR

The present invention relates to a pneumatic actuator according to the preamble of patent claim 1.

Several pneumatic actuators having no pneumatic cylinder are known both explicitly and implicitly such as e.g., from DE 196 17 852 (D1), EP 0 851 829 (D2) and the PCT Application PCT/CH02/00370 (D3), the two last-mentioned by the same applicant as the present invention.

D1 describes a method that is intended to serve for the simple manufacturing of pneumatic and fluidic miniature manipulators made from foils. Said manipulators rely for operation on the tensile force resulting from inflatable and as a result thereof contracting air chambers, said tensile force generating a bending moment in a stabilizing pneumatic supporting element causing the manipulator to bend toward the side of the inflated chambers.

Like pneumatic cylinders, D2 and D3 basically rely for operation on the volume increase of a pneumatic element, mostly in connection with a pressure increase at least within said very element.

D2 deals with a pneumatic adaptive wing the arch of which can be modified by pneumatic elements as well as with pneumatic actuators for actuating the ailerons.

D3 describes an actuator for actuating flap-type component parts, said flap-type component part being adapted to be utilized itself as an actuator.

The major disadvantage of the manipulator described in D1 as a first exemplary embodiment is that with such small bending radii the surface tension is very low and that but ultra small forces can be exerted by means of such a manipulator in order for the pneumatic supporting element not to collapse, thus loosing its capability of absorbing pressure forces. D1 declaredly deals with micromanipulators that are not suited for use on a large scale in the macroscopic range and with forces on the order of one or several Newtons.

The major disadvantage of the actuators described in D1, D2 and D3 taken in their widest sense is that, upon actuation of the actuator, the occurring pressure forces—in the sense of closing force vector polygons—can only be absorbed and accommodated by the hardness of an element that is pneumatic as well, said hardness being in turn effected by air pressure, all the more so since these last-mentioned pneumatic elements substantially consist, in accordance with the invention, of textile component parts that are pressurized with compressed air. Accordingly, the pressure forces to be absorbed are basically limited to $$F = p \cdot A$$

wherein

F=force [in N]
p=air pressure [in N/m$^2$]
A=cross sectional area of the component part [in m$^2$]

The invention described in D2 substantially consists of an air-tight flexible tube made of textile that is inserted in a pivotal flap-type component part so as to be parallel to the pivot axis thereof. If said flexible tube is pressurized with compressed air, its transverse dimension increases. Plate-type movable component parts that fit alongside said flexible tube take its transverse expansion and transmit it in the form of force or torque onto the flap-type component part. The disadvantage of the actuator described in D2 is that its utilization is limited to such problems where the flap-type component part itself can be used as a solution or where its easy pivoting can be readily converted—by further pushing, pulling or rotating means—into other movements or actuations.

It is the object of the present invention to provide a pneumatic actuator that can be formed, modified and utilized in many different ways and in which the reaction forces closing the vector polygon are not, or need not, be performed by further pneumatic elements.

The solution to this object is recited in patent claim 1 with regard to its essential features and in the other patent claims with regard to further advantageous embodiments thereof.

Figure 2:
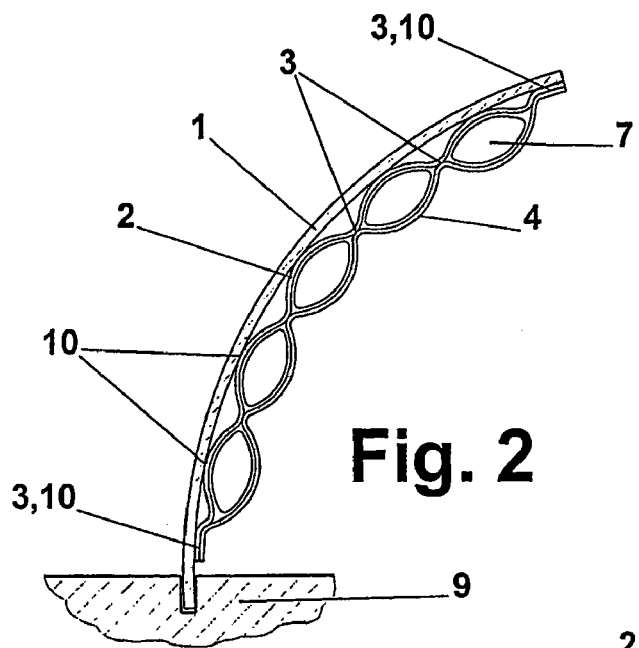
Figure 3:
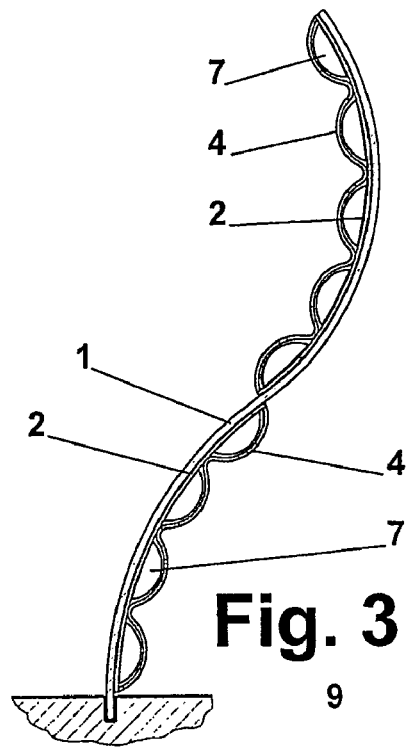
Figure 4:
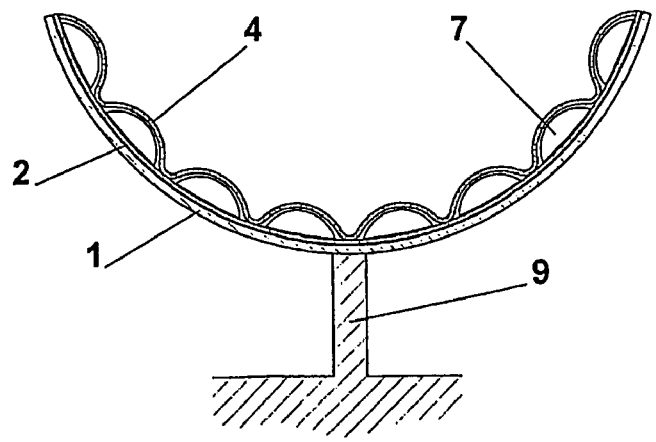
Figure 8:
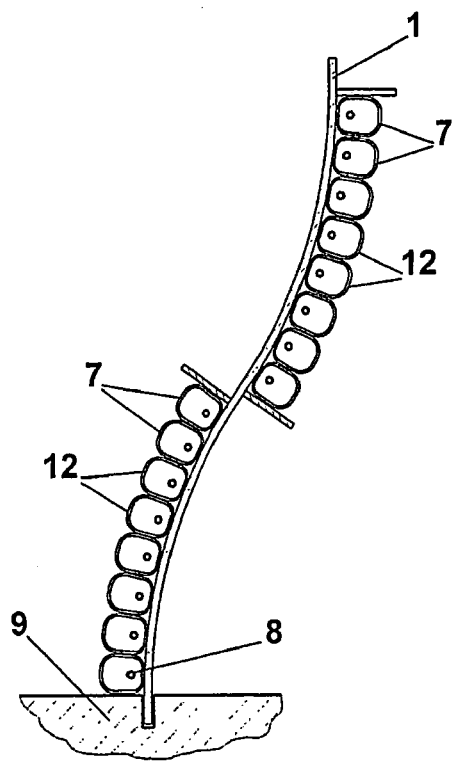
Figure 9:
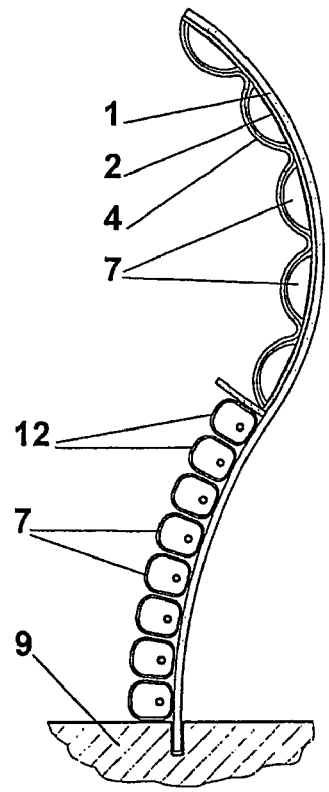
Figure 11:
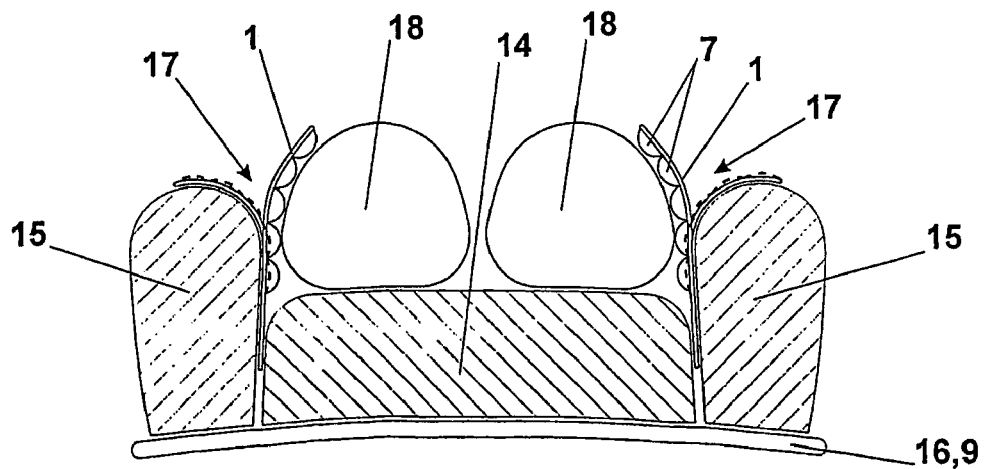
Figure 10:
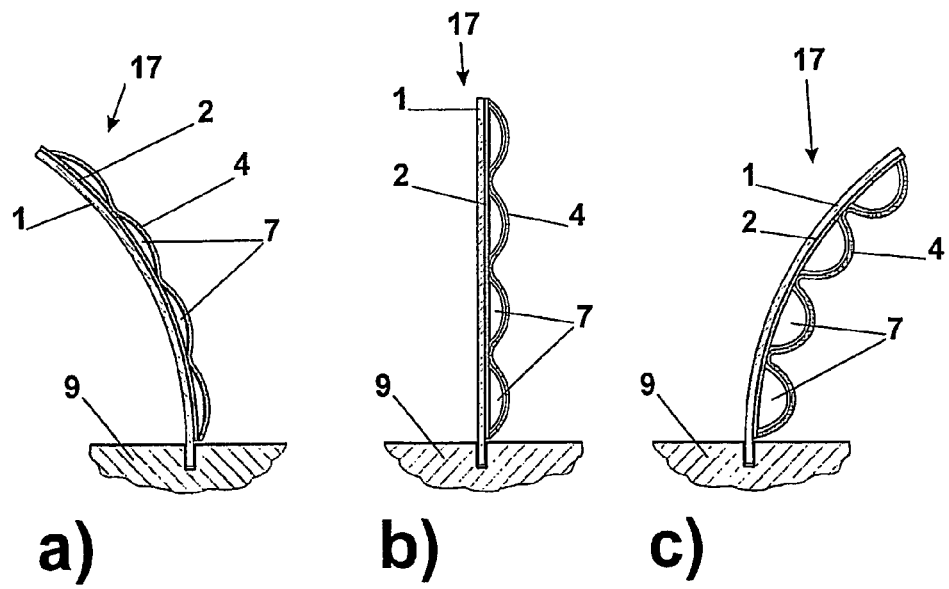
Figure 14:
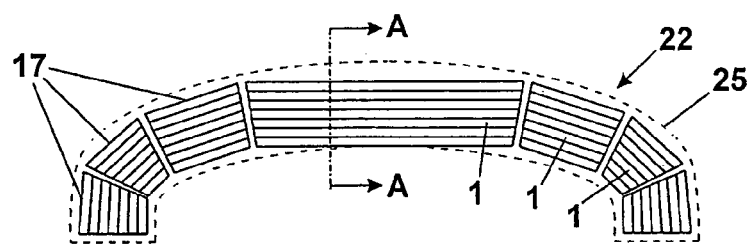
Figure 15:
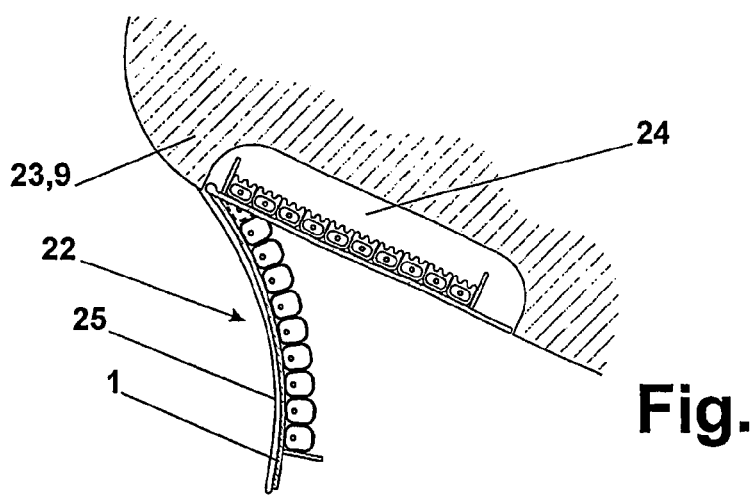
Figure 17:
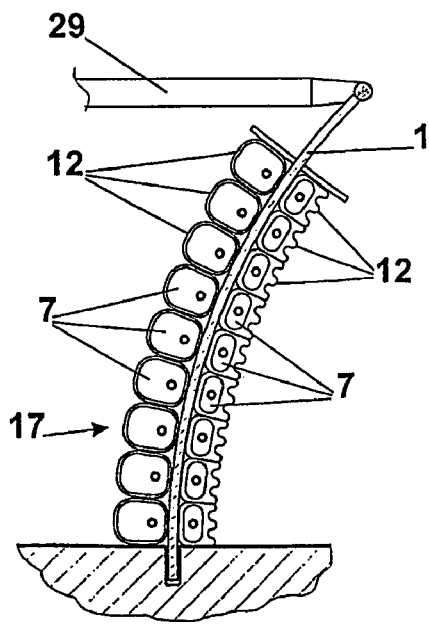
Figure 18:
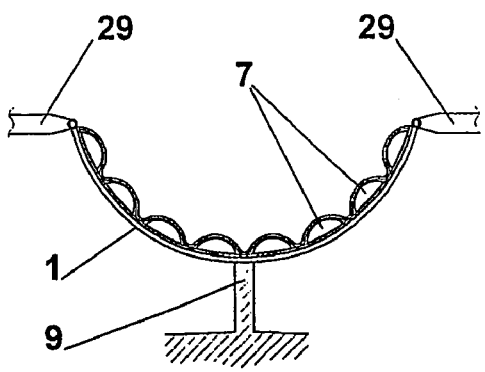

The idea of the invention will be explained in closer detail with reference to the appended drawing, using several exemplary embodiments thereof. In the drawing FIG. 1a is a sectional view of a first exemplary embodiment in the non active state, FIG. 1b shows the exemplary embodiment of FIG. 1a in the activated state, FIG. 1c shows the exemplary embodiment of FIG. 1a in a perspective view, FIG. 2 shows a variant of FIGS. 1a, b, c, FIG. 3 is a sectional view of a second exemplary embodiment, FIG. 4 shows a further variant of FIGS. 1a, b, c, FIG. 5 is a top view of a third exemplary embodiment in the non active state, FIG. 6 is a perspective view of the third exemplary embodiment in the activated state, FIG. 7a is a sectional view of a fourth exemplary embodiment in the non active state, FIG. 7b is a sectional view of the exemplary embodiment of FIG. 7a in the activated state, FIG. 8 is a sectional view of a fifth exemplary embodiment in the activated state, FIG. 9 is a sectional view of a sixth exemplary embodiment in the activated state, FIG. 10a is a sectional view of a variant of the exemplary embodiment of FIG. 1a in the non active state, FIG. 10b is a sectional view of the exemplary embodiment of FIG. 10a activated with mean pressure, FIG. 10c is a sectional view of the exemplary embodiment of FIG. 10b activated with higher pressure, FIG. 11 shows an example of application of the exemplary embodiment of the FIGS. 10a, b, c, FIG. 12a shows a seventh exemplary embodiment in a non-pressurized state, FIG. 12b shows the exemplary embodiment of FIG. 12a with the one side being in the activated state, FIG. 12c shows the exemplary embodiment of FIG. 12a with the other side being in the activated state, FIG. 13a is a sectional view of an eighth exemplary embodiment in the non-active state, FIG. 13b shows the exemplary embodiment of FIG. 13a with the one side being in the activated state, FIG. 14 is a top view of an exemplary embodiment with regard to the use of actuators in accordance with FIG. 7 in the non-active state, FIG. 15 is a sectional view of the exemplary embodiment in accordance with FIG. 14 in the activated state, FIG. 16a is an exemplary embodiment of the actuator in accordance with FIG. 3 in the non-pressurized state, FIG. 16b shows the exemplary embodiment of FIG. 16a in the activated state, FIG. 17 shows an extension of the exemplary embodiment in accordance with FIG. 7, FIG. 18 shows an extension of the exemplary embodiment in accordance with FIG. 4.

FIG. 1 shows a first exemplary embodiment of the idea of the invention in a cross-sectional view, FIG. 1a in the non-active state, FIG. 1b in the active state in which it is pressurized with compressed air, FIG. 1c being a perspective view of FIG. 1a.

Said first exemplary embodiment has a structure consisting of a substantially level plate 1 of constant thickness made of a rigid but flexible material such as spring steel, GFRP, CFRP. A first web 2 of a highly resistant and poorly extensible woven textile made for example of aramide fibers is secured such as by gluing to said plate 1. Securement is preferably but not exclusively performed along several strips 3—five in the present case. A second web 4 is applied to the first web 2, said second web 4 being secured such as by gluing, sewing or welding, together with said first web 2, alongside the same strips 3. As shown in FIG. 1c, the second web 4 can also be connected to the first web 2 alongside the front and rear border 5, 6 of plate 1.

Bladders 7 made of an elastic plastic material are inserted between the strips 3 in the loose portions of the first and the second web 2, 4, said bladders comprising for example one valve 8 each alongside the border 5. The plate 1 is here secured in a component part that defines a reference system 9.

If the bladders 7 are pressurized with compressed air, they swell laterally, thus tensioning the second web 4 which thereby adopts the shape illustrated in FIG. 1b. Since said second web 4 is made of a poorly extensible textile material and since its length will not increase as a result of the deformation shown, the chords will shorten through the bladders 7 according to the arches of the second web 4: the plate 1 is caused to bend. If the spacings between the strips 3 are the same everywhere, the arch formed will be a segment of a circle. Accordingly, the arrangement of the webs 2, 4 will be tension biased. As the plate 1 bends thereby, a force component is generated normal to the surface of the plate in the direction of the inner side of its arch. The force polygons are closed by pressure forces in the plate 1, said pressure forces being oriented tangentially to the plate 1, and by reaction forces applied toward the outer side of their arch. The arrangement of the webs 2, 4 as mentioned and the bladders 7 will be referred to as tensile arrangement for characterization.

The features recited with reference to FIG. 1 can now be varied in many ways: the spacings between the strips 3 can be made irregular, smaller spacings resulting in greater bending radii of the plate 1; the bladders 7 can be pressurized with different pressures with higher pressures effecting smaller bending radii; the thickness of the plate 1 can be modified over the length dimension thereof so that the rigidity of the plate 1 changes; the more rigid the plate 1, the greater the bending radius. As a matter of course, several of these parameters can depart simultaneously from the original features recited, so that the bending radii can actually be varied at will over the length of the plate 1.

Further, the first web 2 can be secured to the plate 1 in the manner shown in FIG. 2. The connection sites of the first web 2 are here located on strips 10 that do not coincide with the strips 3 alongside which the two webs 2, 4 are connected but are substantially provided on the site of greatest swelling of the first web 2 when the bladders 7 are pressurized with compressed air. The strips 3 and 10 only coincide at the ends of the two webs 2, 4. Further, bend lines along which the plate 1 is intended to bend can be provided in that grooves are made in the plate 1, said grooves being provided along lines such as lines 3 or lines 10, so that smaller bending moments already suffice to effect bending of the plate 1 along said bend lines.

FIG. 3 illustrates a second exemplary embodiment. Here, the webs 2, 4 are disposed on the one side of the plate 1 in the lower portion of the plate 1 as shown in the FIG. and on the other side in the upper portion thereof. Inflating the bladders 7 results in the S-shaped bend shown in FIG. 3. It is to be understood that the sides can be changed several times in the arrangement, which results in a serpentine line showing several S-shapes. Also, all of the alternative variants described hereto before can be incorporated either individually or in any combination so that a host of solutions is obtained in accordance with the invention.

FIG. 4 basically corresponds to the illustration shown in FIG. 1 but for the plate 1 which is not connected to the reference system 9 at one end but at its center. As a matter of course any other securing site is included in the inventive idea. The plate 1 then arches to form a channel.

The webs 2, 4 can be interrupted at the junction to the reference system 9 as shown or they can extend over it. As an alternative to a moment transmitting securement, securement can also be articulated so that the plate 1 be also generally pivotal relative to the reference system 9.

FIG. 4 also includes the possibility to mount the webs 2, 4 with the bladders 7 to the lower side of the plate 1 as viewed in the illustration so that the arch is directed downward. Again, the exemplary embodiment in accordance with FIG. 4 includes all the variants already described with reference to the design of the plate 1 and of the webs 2, 4 and bladders 7 together forming what are termed pneumatic elements.

FIG. 5 is the top view of the plate 1 of a third exemplary embodiment. Here, the strips 3 and 10 resp. are not arranged parallel to each other but so as to converge. The strips 3, 10 are provided to be oriented in a straight line, although they may also be curved in such a manner that the bending moments intended to occur in the plate 1 build up as a result of the chords shortening as described.

In FIG. 6, the plate is clamped in the reference system 9 in the manner illustrated in FIG. 1. Clamping ways as they have been described with reference to FIG. 4 pertain to this exemplary embodiment just like all the variants referring to the pneumatic elements. If in this exemplary embodiment the bladders 7 are pressurized with compressed air, the plate 1 bends to form a cone segment.

FIG. 7 illustrates a fourth exemplary embodiment of the inventive idea. FIG. 7a shows the embodiment in the non pressurized state, FIG. 7b in the state in which it is pressurized with compressed air. A plurality of envelopes 12 configured like flexible tubes are disposed on the plate 1, said envelopes being made from a poorly extensible textile material corresponding to that of the webs 2, 4.

The envelopes 12 are substantially connected at their entire surface adjacent the plate 1, said connection being achieved such as by gluing, welding or by means of a suited mechanical connection. Bladders 7, which are also configured like flexible tubes and are provided with valves 8, are inserted in these envelopes 12 that extend substantially over the entire width of the plate 1. In the non pressurized state, the bladders 7 are flaccid, the plate 1 has the original shape e.g., level as illustrated in FIG. 7a.

If the bladders 7 are filled with compressed air, they expand to maximum size which is limited by the outer envelopes 12. As soon as the envelopes 12 mutually exert forces onto each other as a result of the bladders 7 becoming inflated, they effect bending moments in the plate 1 which they urge to take the shape illustrated in FIG. 7b if it was level before. The bending radius achieved depends on the number of bladders 7 with envelopes 12 used per length unit chosen, the pressure exerted by the air and the shape of the envelopes 12, further on the thickness of the plate 1, its material and its modulus of elasticity. Since the bladders 7 mutually exert a pressure onto each other and the plate 1 is bent away from the pneumatic elements through the generated bending moments, the pressure forces get a force component that is directed toward the inner side of the plate's arch. The major part of the pressure forces is accommodated as tensile force in the plate 1.

This arrangement of the pneumatic elements will herein after be characterized as a pressure arrangement.

As explained with reference to the first exemplary embodiment, the following variables may also be varied on this one: the spacings between the bladders 7, the thickness of plate 1, the pressures in the bladders 7. The bending radii over the curve described by the plate 1 can thus be targeted to actual needs. The bend lines of the type described herein above are again in accordance with the invention.

FIG. 8 illustrates a fifth exemplary embodiment and basically corresponds to that shown in FIG. 3 with regard to the arrangement of the bladders 7 except that here the bladders exert pressure forces onto the outer side of the bend in the plate 1 whereas in the exemplary embodiment of FIG. 3, tensile forces are exerted onto the inner side of said bend. Here, the plate 1 is subject to tensile forces oriented tangentially to the plate 1—for closing the force polygons; in the exemplary embodiment in accordance with FIG. 3, the forces exerted are tangentially oriented pressure forces.

The sixth exemplary embodiment of FIG. 9 comprises in its lower portion with regard to the reference system 9 an arrangement of bladders 7 in accordance with FIG. 7, meaning a pressure arrangement, and in its upper portion an arrangement in accordance with FIG. 1, meaning a tensile arrangement, the bladders 7 being in both cases disposed on the same side of the plate 1 so that, when the bladders 7 are being pressurized, the plate 1 is caused to deform into the same S-shape as in the FIGS. 3, 8.

Again, all the already mentioned parameters can be varied so that a host of deformations can thus be effected. It is also possible, as a matter of course, to connect the plate in the exemplary embodiments in accordance with the FIGS. 6, 7, 8, 9, at a site located between the ends thereof, to the reference system, said connection being either rigid or articulated as explained with reference to FIG. 3.

In the exemplary embodiment in accordance with the FIGS. 10a, b, c, the initial shape of the plate 1 as illustrated in FIG. 10a is bent in the non pressurized state of the bladders 7 in such a manner that the arrangement of bladders 7 and webs 2, 4 in accordance with FIG. 1 is located on the outer side of the bend.

By exerting onto the bladders 7 a moderate pressure, the plate 1 can be brought to the level shape as shown in FIG. 10b, a higher pressure causes it to bend into the shape shown in FIG. 10c. If the plate 1 is pre-bent as shown in FIG. 10a, the same effect may be achieved with a pressure arrangement of the bladders 7 in accordance with FIG. 7 if the bladders 7 are provided on the other side of the plate 1 as compared to FIG. 10a.

FIG. 11 is an illustration of a first exemplary embodiment of the invention. It schematically shows a vehicle seat 13 from the front. Said vehicle seat is divided, as it is common practice today, into a seat padding 14 and two side paddings 15. Between the seat padding 14 and a respective one of the two side paddings 15 there is inserted one pneumatic actuator 17 each, for example in accordance with FIG. 10, that is anchored in a seat frame 16 used as a reference system 9. In the non pressurized state, the two actuators 17 fit against the seat paddings 15 and accordingly form part thereof. If the bladders 7 are pressurized with compressed air, the plates 1 bend inward until they laterally fit against the thighs 18 of the driver, which are shown in a schematic sectional view, said bladders laterally supporting the thighs when the vehicle travels around a curve.

Figure 12:
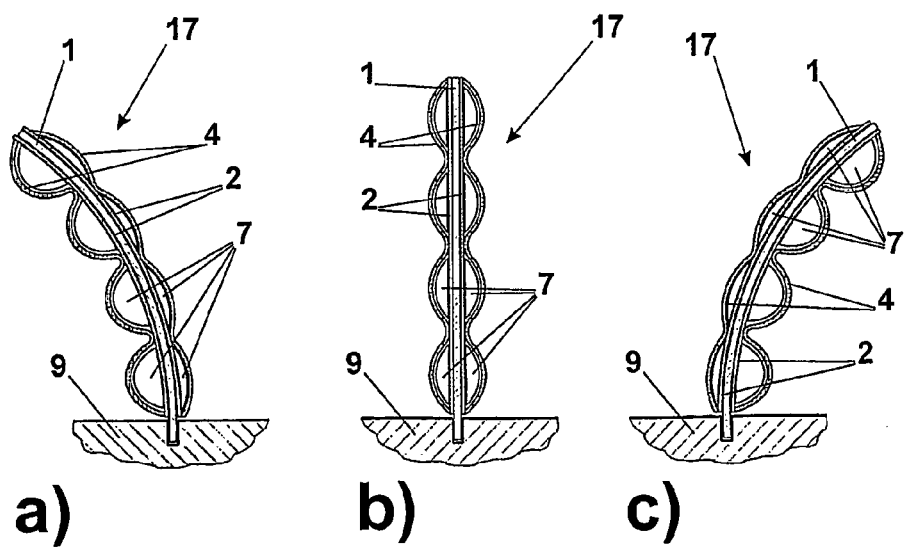

In the seventh exemplary embodiment in accordance with FIG. 12, pneumatic elements in accordance with FIG. 1 or 2 are mounted to either side of the plate 1. FIG. 12a shows the thus configured pneumatic actuator 17 with tensile arrangement in the non pressurized state and, if the plate 1 is level, in the neutral central position. In FIG. 12b, the pneumatic elements of the left side of the plate 1 are pressurized, that is active, in FIG. 12c the right side pneumatic elements are the ones which are active. An actuator 17 that can be controlled from both sides is thus achieved.

Figure 13:
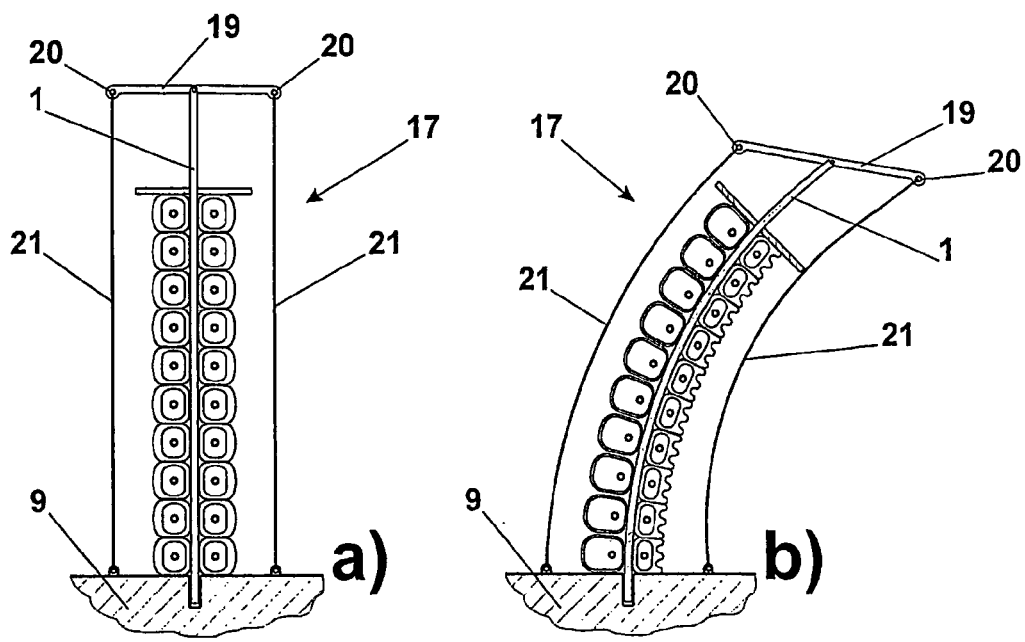

The eighth exemplary embodiment in accordance with FIG. 13 is built analogous to the one shown in FIG. 12, but uses the pneumatic elements of the exemplary embodiment of FIG. 7, meaning a pressure arrangement. Here a rocking bar 19 is articulated to the upper end of the plate 1, said rocking bar extending for example over the entire width of the plate 1, said width extending normal to the plane of the drawing. Said rocking bar 19 also comprises at its ends joints 20 in which the upper ends of two additional flexible plates 21 are mounted. Said plates are secured at their lower ends to the reference system 9.

If the bladders 7 are now pressurized with compressed air on the left side of the plate 1 in the FIGS. 13a, b, the plate 1 will bend toward the right as already explained with reference to FIG. 7b. The additional plates 21 will bend in the same way. The thus implemented actuator 17 is protected from mechanical damage as a result thereof.

The implementation with the additional plates 21 can of course be realized with all the afore mentioned exemplary embodiments. An actuator 17 in accordance with FIG. 13 can for example be utilized as a guide in conveyor systems for parceled or bulk goods.

The FIGS. 14 and 15 show another exemplary embodiment of the inventive idea with regard to the use of actuators 17 as they have been described herein above, for example in accordance with FIG. 7. This example of utilization shows that the actuator 17, which basically comprises a single-axis bend, can also be utilized to actuate multiple-axes bend devices. The device chosen here by way of example is a front spoiler 22 of an automotive vehicle. FIG. 14 is a top view, FIG. 15, the cross section along AA. The basically provided arch of the front spoiler 22 is shown with several—here for example seven—actuators 17 being secured, for example in accordance with FIG. 7, along a shock absorber 23 employed as the reference system 9, meaning in pressure arrangement. In the non pressurized state, said actuators 17 are located in a bight portion 24 of the shock absorber 23; the pneumatic elements, which are located on the upper/rear side of the plates 1 anyway, are thus protected from dirt, falling rocks and moisture. To the outer front side, the actuators are coated with an elastic apron 25 that smooths out the shape on the one side and protects the actuators 17 on the other side.

If the front spoiler 22 is to be brought in its extended position, the pneumatic elements are activated, the plates 1 bend downward/toward the front while causing the elastic apron 25 to extend. In accordance with the invention, an additional plate 21 with a rocking bar 19 can here be mounted to the rear side of actuator 17; additionally, the plates 1, 21 can be connected laterally by an elastic material, so that the pneumatic elements are completely protected from weather conditions.

It will be understood that by modifying accordingly the shape of the apron 25 and, if necessary, the number of actuators 17, the example of utilization can be utilized for rear spoilers as well. In this case, the bight portion 24 is housed in the region of the vehicle's trunk and the apron 25 smoothly covers the entire device when retracted.

Figure 16:
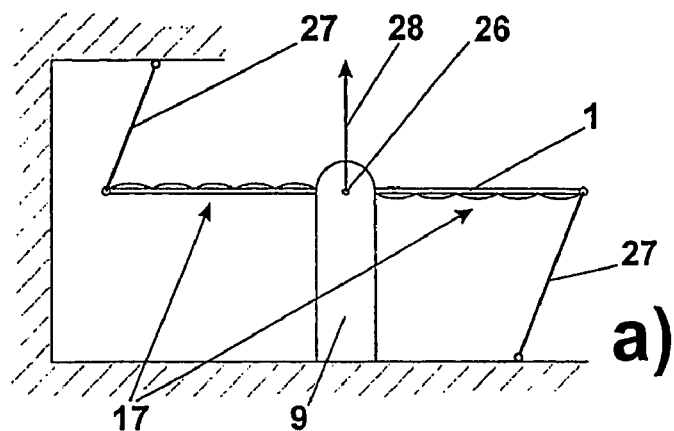
Figure 16:
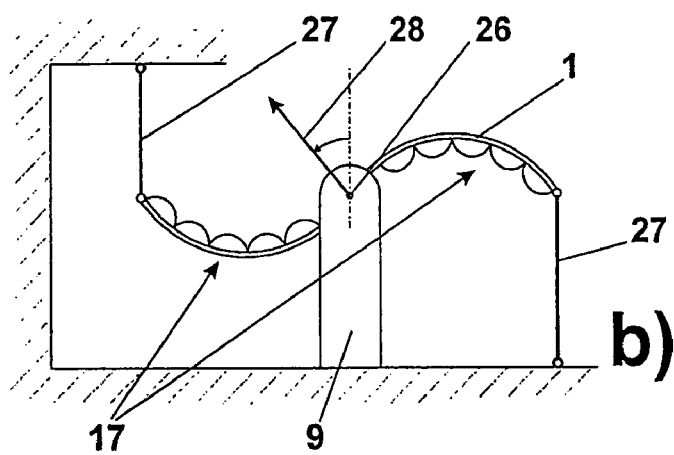

FIG. 16 shows an example of utilization of a pneumatic actuator 17, for example in accordance with FIG. 3 in tensile arrangement, in which the actuator 17 is capable of generating a torque and of transmitting the latter to another device. The example of utilization is given by way of example only. The actuator is mounted to the reference system 9 so as to be pivotal about an axis 26 and is hinge guided by means of two pivotal plates 27 and is level for example in the non pressurized state. If its pneumatic elements are pressurized, the plate 1 deforms, as already described, into an S-shape. As a result, the plate 1 rotates about the axis 26, which is clearly shown by the rotation of a merely symbolic pointer 28.

It will be understood that instead of utilizing the actuator 17 in the tensile arrangement in accordance with FIG. 3, an actuator may be used in the pressure arrangement in accordance with FIG. 8, including all the variants already described.

FIG. 17 illustrates another utilization in accordance with the invention of the pneumatic actuator 17. A rod 29 is articulated preferably to the upper end of the plate 1 in accordance with FIG. 17, said rod being capable of transmitting tensile and pressure forces. The pneumatic actuator 17 in the pressure arrangement is here constructed in accordance with FIG. 7a, b, the bladders 7 with their envelopes 12 being complementarily disposed to either side of the plate 1. As a result, the actuator 17 can be bent on both sides, with corresponding working travel of the rod 29. In accordance with the invention, all the arrangements in accordance with the FIGS. 1, 2, 7, 10, 12, 13 are utilizable with such rods 29 or equivalent mechanical machine elements. In many cases of application, such a schematically described device may be used in replacement of pneumatic cylinders with the advantage that the friction that is to be overcome is negligibly small.

FIG. 18 shows a corresponding implementation of the exemplary embodiment in accordance with FIG. 4. Here, one rod 29 is articulated to each of the two ends of the plate 1. In the non pressurized state of the bladders 7, the plate 1 can already be bent as shown in the FIG. As a result, the force-displacement behavior of the rods 29 can be easily targeted to actual needs.

The invention claimed is:

1. A pneumatic actuator comprising:
a flexible plate, wherein said flexible plate is made of a rigid flexible material;
at least two elongate, flexible but poorly extensible pneumatic pressure ducts that are disposed side by side and are in parts connected to the flexible plate to which they are secured and on which they are arranged in such a manner that, when said pressure ducts are pressurized with compressed gas, tangential forces are generated parallel to the flexible plate causing said flexible plate to bend;
wherein each of the at least two pressure ducts comprise a flexible envelope made of poorly extensible textile material and a gas tight bladder inserted in said envelope, said envelope comprising:
a first web of a poorly extensible textile material connected to the flexible plate on strips, said strips being oriented substantially parallel to each other; and
a second web covering said first web and made of a poorly extensible textile material, said second web being connected to the first web along said strips, whereby forming between the first and second webs each of said envelope;
wherein, for each of the at least two pressure ducts, the bladder is inserted into the envelope; and
wherein if the bladder of each of the at least two pressure ducts is pressurized with compressed gas, the first and second webs between the strips bulge, exerting onto the flexible plate tangentially oriented tensile forces causing the flexible plate to bend on a side of the pressure ducts, defining a tensile arrangement.

2. The pneumatic actuator in accordance with claim 1, wherein for each said flexible plate there is only provided one tensile arrangement formed from a plurality of pressure ducts.

3. The pneumatic actuator in accordance with claim 1, wherein for each said flexible plate there are provided at least two tensile arrangements, said tensile arrangements being each formed from a plurality of pressure ducts.

4. The pneumatic actuator in accordance with claim 3, wherein all of the tensile arrangements are mounted to the same side of the flexible plate.

5. The pneumatic actuator in accordance with claim 3, wherein the tensile arrangements are mounted in alternating fashion on either side of the flexible plate so that, if the tensile arrangement is simultaneously pressurized, the flexible plate bends into a multiple S shape.

6. The pneumatic actuator in accordance with claim 3, wherein the tensile arrangements are mounted to either side of the flexible plate and can be alternatingly pressurized with compressed gas so that the flexible plate can bend to the one or to the other side alternatively.

7. The pneumatic actuator in accordance with claim 1, wherein for each said flexible plate, at least one tensile arrangement and one pressure arrangement each are provided and secured to said flexible plate.

8. The pneumatic actuator in accordance with claim 7, wherein the tensile arrangement and the pressure arrangement are mounted to the same side of the flexible plate, wherein if the tensile arrangement and the pressure arrangement are simultaneously pressurized with compressed gas, the flexible plate bends to form at least the shape of one S.

9. The pneumatic actuator in accordance with claim 1 wherein, for each said flexible plate, at least one tensile arrangement and one pressure arrangement are provided and secured to said flexible plate.

10. A pneumatic actuator comprising:
a flexible plate, wherein said flexible plate is made of a rigid flexible material;
at least two elongate, flexible but poorly extensible pneumatic pressure ducts that are disposed side by side and are in parts connected to the flexible plate to which they are secured and on which they are arranged in such a manner that, when said pressure ducts are pressurized with compressed gas, tangential forces are generated parallel to the flexible plate causing said flexible plate to bend;

wherein each of the at least two pressure ducts comprise a flexible envelope made of poorly extensible textile material and a gas tight bladder inserted in said envelope;

the envelope for each of the at least two pressure ducts is configured like a flexible tube;

the envelope for each of the at least two pressure ducts is connected to the flexible plate on part of its circumference;

for each of the at least two pressure ducts, the bladder is inserted in the envelope and forms, together with the envelope, the pressure duct; and if the bladder for each of the at least two pressure ducts is pressurized with compressed air, the pressure ducts exert pressure forces onto each other generating pressure forces oriented tangentially to the flexible plate causing the plate to bend on a side of the flexible plate turned away from the pressure ducts, defining a pressure arrangement.

11. The pneumatic actuator in accordance with claim 10, wherein for each said flexible plate, there is provided only one pressure arrangement formed from a plurality of pressure ducts.

12. The pneumatic actuator in accordance with claim 10, wherein for each said flexible plate, there are provided at least two pressure arrangements, said pressure arrangements being each formed from a plurality of pressure ducts.

13. The pneumatic actuator in accordance with claim 12, wherein all of the pressure arrangements are mounted to the same side of the flexible plate.

14. The pneumatic actuator in accordance with claim 12, wherein the pressure arrangements are mounted in alternating fashion on either side of the flexible plate so that if the pressure arrangement is simultaneously pressurized, the flexible plate bends into a multiple S shape.

15. The pneumatic actuator in accordance with claim 10, wherein the pressure arrangements are mounted on either side of the flexible plate and can be alternatingly pressurized with compressed gas so that the flexible plate can bend to the one or to the other side alternatively.

16. A pneumatic actuator comprising:
a flexible plate, wherein said flexible plate is made of a rigid flexible material;
at least two elongate, flexible but poorly extensible pneumatic pressure ducts that are disposed side by side and are in parts connected to the flexible plate to which they are secured and on which they are arranged in such a manner that, when said pressure ducts are pressurized with compressed gas, tangential forces are generated parallel to the flexible elate causing said flexible plate to bend;
wherein each of the at least two pressure ducts comprise a flexible envelope made of poorly extensible textile material and a gas tight bladder inserted in said envelope, said envelope comprising:
a first web of a poorly extensible textile material connected to the flexible plate on a first set of strips, wherein said first set of strips are oriented substantially parallel to each other; and
a second web covering said first web and made of a poorly extensible textile material, said second web being connected to the first web along a second set of strips and oriented parallel to said first set of strips, whereby forming between the first and second webs each of said envelope;
wherein, for each of the at least two pressure ducts, the bladder is inserted into the envelope; and wherein if the bladder for each of the at least two pressure ducts is pressurized with compressed gas, the first and second webs between the second set of strips bulge, exerting onto the flexible plate tangentially oriented tensile forces causing the flexible plate to bend on a side of the pressure ducts, defining a tensile arrangement.

17. A pneumatically actuatable side support of a vehicle seat comprising:
a pneumatic actuator, wherein the pneumatic actuator is disposed on each side of a seat padding and secured to a seat frame employed as a stationary reference system;
the pneumatic actuator comprises a flexible plate that is bent in a non pressurized state of the pneumatic actuator and may fit against a side padding in the non pressurized state;
wherein the pneumatic actuators can be pressurized with compressed gas, bending away from the side padding and coming to rest, at least in parts, on a driver's thighs which they are capable of supporting laterally; and
wherein the flexible plate is made of a rigid flexible material.

18. A pneumatically actuatable non pressurized front spoiler of an automotive vehicle comprising:
a front shock absorber disposed therebehind;
a bight portion for receiving the non pressurized front spoiler;
at least one pneumatic actuator, wherein the pneumatic actuator is secured to one end of a flexible plate on an underside of the automotive vehicle alongside the front shock absorber;
wherein for the flexible plate, there is provided one pressure arrangement formed from a plurality of pressure ducts, the pressure arrangement being disposed and secured to an upper side of the flexible plate;
wherein the at least one pneumatic actuator is provided and coated at least to the front, in a normal direction of travel with an apron made of an elastic plastic material for protecting said at least one pneumatic actuator;
wherein the at least one pneumatic actuator bends downward and toward the front when pressurized with compressed gas and adopts the shape and performs a function of the front spoiler;
wherein the at least one pneumatic actuator bends back into the bight portion due to the elasticity of the flexible plate when the gas pressure is removed; and
wherein the flexible plate is made of a rigid flexible material.

19. The pneumatically actuatable non pressurized front spoiler in accordance with claim 18, wherein the non pressurized front spoiler consists of at least three pneumatic actuators that are coated with the apron made of an elastic plastic material.

20. A pneumatically actuatable non pressurized rear spoiler of an automotive vehicle comprising:
a trunk;
a bight portion for receiving the non pressurized rear spoiler disposed in a region thereof;
at least one pneumatic actuator, wherein the pneumatic actuator is secured to one end of a flexible plate on a border of the bight;
wherein for the flexible plate, there is provided one pressure arrangement formed from a plurality of pressure ducts, the pressure arrangement being disposed and secured to an underside of the flexible plate;

wherein the at least one pneumatic actuator is provided and coated at least in a top portion with an apron made of an elastic plastic material;

wherein the at least one pneumatic actuator bends upward and toward the front when pressurized with compressed gas and adopts the shape and performs the function of a rear spoiler;

wherein the at least one pneumatic actuator bends back into the bight portion due to the elasticity of the flexible plate when the gas pressure is removed; and wherein the flexible plate is made of a rigid flexible material.

* * * * *